J. A. & S. S. Woodward & Mason.
Wheel Cultivator.
No. 3,541. Reissued Jul. 6, 1869.
Fig: 1.
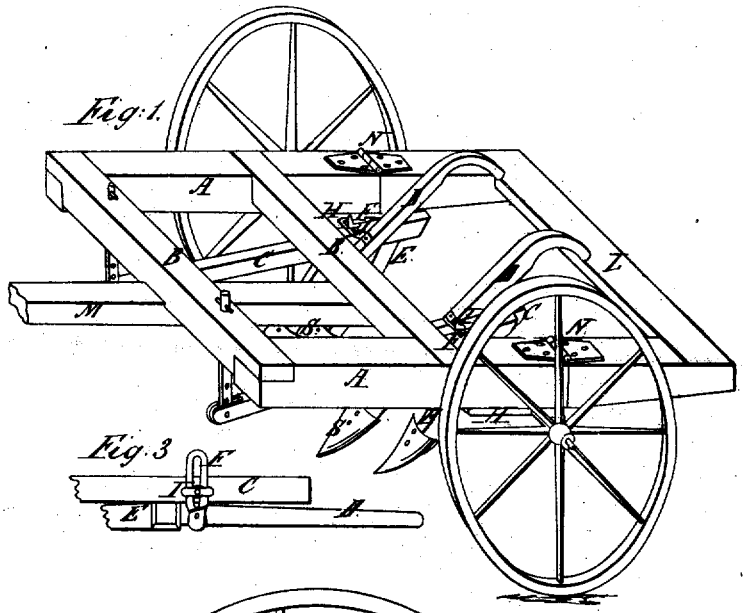
Fig: 3
Fig: 2
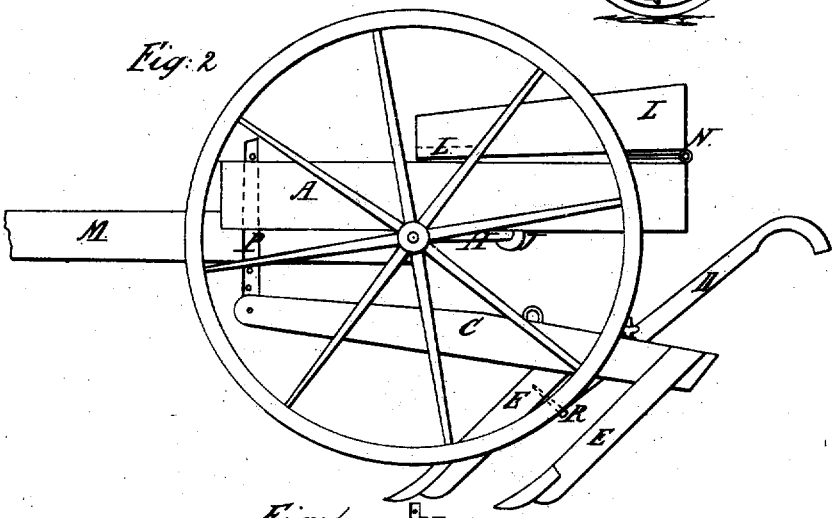
Fig: 4.
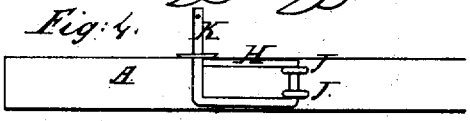
Witnesses
J. E. Phelps
C. G. Culver.
Inventors
J. A. Woodward
Thomas Mason
S. S. Woodward.
By G. L. Chapin
Atty.
N. PETERS, PHOTO-LITHOGRAPHER, WASHINGTON, D. C.

UNITED STATES PATENT OFFICE.

J. A. WOODWARD, S. S. WOODWARD, AND THOMAS MASON, OF SANDWICH, ILLINOIS.

IMPROVEMENT IN CULTIVATORS.

Specification forming part of Letters Patent No. 82,191, dated September 15, 1868; Reissue No. 3,541, dated July 6, 1869.

*To all whom it may concern:*

Be it known that we, J. A. WOODWARD, S. S. WOODWARD, and THOMAS MASON, of Sandwich, in the county of De Kalb and the State of Illinois, have invented a useful Improvement in Cultivators; and we do hereby declare that the following is a full and exact description thereof, reference being had to the accompanying drawings, and to the letters of reference marked thereon, making a part of this specification, in which—

Figure 1 is a perspective representation of our invention as arranged for the operator to ride; Fig. 2, a side elevation of the same arranged as when the operator is to walk in the rear; Fig. 3, a top view of the device by which the shovel-handles are adjusted; Fig. 4, a view of the under side of the frame near one of the wheels and the reversible hinge-joint.

This invention relates to an improvement in that class of cultivators which are supported on axle-trees and wheels, and used more especially for cultivating crops planted in rows; and its nature in part consists in so hinging or pivoting the axle-tree arms to the frame of the cultivator that they may be swung to the front or back of the pivots, and thereby balance the frame when the seat is arranged either for the operator to ride or walk; and in the application of a jointed seat at the rear of the frame, by means of which, when the operator sits thereon and the wheels are thrown back, the frame will balance on the axle the same as when the wheels are thrown to the front and the seat is folded on its top; and, further, in the application of adjustable handles pivoted to the standards of the shovels and arranged so that their upper ends may be set the desired distance apart for the convenience of tilling the row.

The object to be gained by this general arrangement is a walking and riding cultivator having a simple construction, and one which can be made at small cost and operated in a superior manner.

To enable others to fully comprehend the construction and operation of our invention, we have marked corresponding parts with similar letters, and will now give a detailed description.

A B represent a substantial frame, which is made of wood or other suitable material, and supports a seat, L, which is hinged to the rear end of said frame at N N and arranged for the operator to ride on it when it is in position as shown at Fig. 1, and to fold over onto the frame A B when the operator is to walk, as shown at Fig. 2. The axle-arms K, Fig. 4, are provided with hinges H, which are jointed to the side pieces, A, of the frame A B at J J, and so arranged as to swing to the front or back of the joints, and thus balance the frame when the operator is riding or walking. In this construction no axle-tree connecting the arms K is required; but, if desirable, an ordinary axle-tree can be used by simply attaching the hinges H to it. The shovel-standards E E are secured to the beams C C in the usual manner, and the handles, by means of which they are operated, are pivoted to the back sides of said standards at R, Fig. 2, in order that the upper ends of the handles may be adjusted to or from each other, as the case may require, for the convenience of the operator; and in order that they may be held firmly in position when adjusted, slotted plates F of iron are rigidly attached to the handles and project over the beams C C, and are held fast to them by means of set-screws I I, Figs. 1 and 3. This latter arrangement is quite simple, yet important, for if it or a similar device is not used the inner shovels, S S, cannot be so conveniently guided.

There are other parts of the cultivator which have not been described in detail, inasmuch as they have a common construction and will be fully understood by reference to the drawings.

Operation: Fig. 1 represents the cultivator arranged for the operator to ride, and in order to change it into what is known as a "walking-cultivator," as shown at Fig. 2, the seat L must be placed or folded on the top of frame A B and the rear of the latter raised up while the wheels are run forward. This operation will swing the reversible hinges H H to the front, and thus prevent the tongue from bearing down too heavily or raising up and choking the team.

Having thus described our invention, what we claim, and desire to secure by Letters Patent of the United States, is—

1. Broadly, the reversible arms K, hinged to the frame A B and arranged to balance the same, substantially as set forth.

2. The combination of the above-described reversible arms K with the frame A B and folding seat L, as and for the purpose herein described.

3. The handles D D, pivoted to the standards E E and made adjustable to or from each other by means of the slotted plates F F and set-screws I I, as described and shown.

J. A. WOODWARD.
S. S. WOODWARD.
THOMAS MASON.

Witnesses:
F. A. MUNSON,
ROBT. PATTEN.